(12) United States Patent
Song

(10) Patent No.: US 9,776,546 B2
(45) Date of Patent: Oct. 3, 2017

(54) TILTING APPARATUS FOR VEHICLE DECK

(71) Applicant: Hyundai Motor Company, Seoul (KR)

(72) Inventor: Ji Yong Song, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/268,823

(22) Filed: Sep. 19, 2016

(65) Prior Publication Data

US 2017/0158106 A1 Jun. 8, 2017

(30) Foreign Application Priority Data

Dec. 2, 2015 (KR) .................. 10-2015-0170628

(51) Int. Cl.
*B60P 1/16* (2006.01)

(52) U.S. Cl.
CPC ............. *B60P 1/165* (2013.01); *B60P 1/16* (2013.01)

(58) Field of Classification Search
CPC .................................. B60P 1/165; B60P 1/16
USPC ........ 298/17.5, 17.6, 17.7, 18, 22 R, 22 P, 9, 298/17.8; 92/161; 403/31
See application file for complete search history.

(56) References Cited

U.S. PATENT DOCUMENTS 1,534,439 A * 4/1925 Burkhardt ............... B60P 1/165
298/17.7

FOREIGN PATENT DOCUMENTS

| JP | 5386571 B2 | 1/2014 |
|---|---|---|
| KR | 1988-0000077 Y1 | 8/1986 |
| KR | 1998-0035708 U | 9/1998 |
| KR | 10-0323737 B1 | 2/2002 |
| KR | 10-0401835 B1 | 10/2003 |

* cited by examiner

*Primary Examiner* — Stephen Gordon
(74) *Attorney, Agent, or Firm* — Mintz Levin Cohn Ferris Glovsky and Popeo, P.C.; Peter F. Corless

(57) ABSTRACT

A tilting apparatus for a vehicle deck is provided. The tilting apparatus increases the efficiency of a loading and unloading workability by tilting the vehicle deck vertically or horizontally based on situations or conditions of construction fields or industrial fields. The tilting system includes a structure with vertical and horizontal tilting performed in a single system by joining a deck plate and a chassis frame of the deck with a ball joint structure of four locations (e.g., front, back, left, and right locations) and implementing a hydraulic system that may be tilted in two directions.

6 Claims, 12 Drawing Sheets

[ AT ORDINARY TIMES ]   [ UPON BACKWARD TILTING ]

TILTING APPARATUS FOR VEHICLE DECK

CROSS-REFERENCE TO RELATED APPLICATION

This application claims under 35 U.S.C. §119(a) the benefit of priority to Korean Patent Application No. 10-2015-0170628 filed on Dec. 2, 2015, the entire contents of which are incorporated herein by reference.

BACKGROUND (a) Technical Field

The present disclosure relates to a tilting apparatus for a vehicle deck, and more particularly, to a tilting apparatus for a vehicle deck for loading and unloading freights in the vehicle deck by adjusting the deck vertically or horizontally.

(b) Background Art

Generally, a titling apparatus for a vehicle deck loads and transports various types of products and then unloads the products by adjusting the deck and tilting or opening a bottom of the deck. In particular, products that may be damaged due to a shock upon the loading and unloading are required to be carefully loaded and unloaded and building materials that include sand and gravel that are less likely to be damaged are quickly loaded and unloaded when the deck is adjusted (e.g., tilted) backward by lifting a front portion of the deck to reduce the loading and unloading time.

Further, adjustment in a vertical or horizontal direction of the vehicle deck are necessary in industrial fields, while many vehicle decks are designed to only adjust in the backward orientation. In characteristics of construction fields or industrial fields, when freights that include aggregate in the vehicle deck are unloaded, the deck is adjusted (e.g., tilted) horizontally and when the deck is adjusted backward, a road clearance is high and it may be difficult to unload the freights. In other words, when the horizontal tilting occurs, the road clearance is low when the vehicle deck is tilted and therefore it is possible to unload the freights. Further, to combine the horizontal tilting to the vertical tilting system, another apparatus is required to be installed. Accordingly, the present invention provides a system for tilting a vehicle deck vertically and horizontally in a single system.

The above information disclosed in this section is merely for enhancement of understanding of the background of the invention and therefore it may contain information that does not form the prior art that is already known in this country to a person of ordinary skill in the art.

SUMMARY

The present invention provides a tilting apparatus for a vehicle deck to increase efficiency of a loading and unloading work by tilting the vehicle deck vertically or horizontally based on situations or conditions of construction or industrial fields. The tilting system for a deck includes a new structure with both vertical tilting and horizontal tilting in a single system by coupling a deck plate and a chassis frame of the deck with a ball joint structure of four locations including front, back, left, and right locations and implementing a hydraulic system that may be tilted in a plurality of directions.

A tilting apparatus for a vehicle (e.g., a truck) deck is provided and may include a deck ball joint component of four locations of front, back, left, and right locations may couple a chassis frame and a deck plate and a hydraulic ball joint component that connects a rod of the hydraulic machine configured to be disposed at the chassis frame and may be adjusted (e.g., tilted) in two directions to a center area of a bottom surface of the deck plate to rotate the deck plate vertically and horizontally.

According to an exemplary embodiment of the present invention, the deck ball joint component may insert a ball formed at an end portion of a frame member into a circular tube-shaped bracket formed at an end portion of a plate member and may be coupled together with a detachable fixing pin. Furthermore, according to another exemplary embodiment of the present invention, the ball may include a neck component and the bracket may include a slot disposed in a length direction that extends from a lower end and the ball and slidably enters the bracket using the neck component inserted into the slot and may be coupled by the fixing pin to the bracket.

Furthermore, according to an exemplary embodiment of the present invention, a body of the hydraulic machine tilted in two directions may be inserted into a support body rotatably disposed in a vehicle length direction and may be supported on the chassis frame by a first pin and may be rotatably disposed in a vehicle width direction and may be supported on the support body by a second pin. According to an exemplary embodiment of the present invention, the hydraulic ball joint component may include a ball component coupled to the rod and a housing component disposed at the deck plate that receives the ball component.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
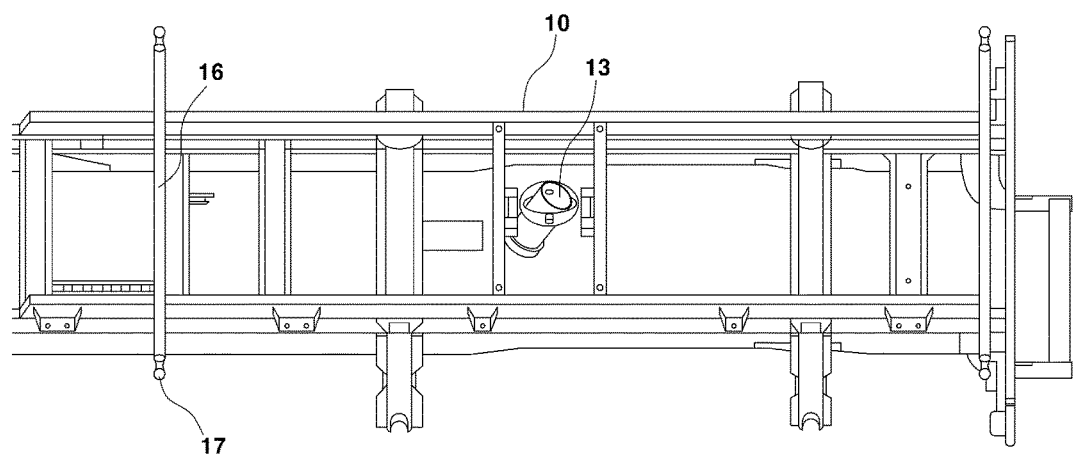
FIG. 1 is an exemplary plan view illustrating a deck frame in a tilting apparatus for a vehicle deck according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
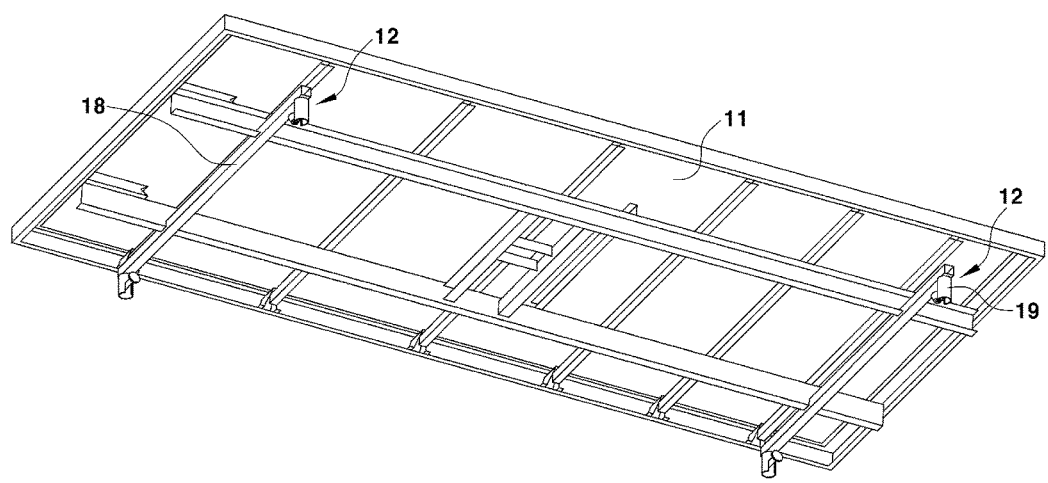
FIG. 2 is an exemplary perspective view illustrating a deck plate in the tilting apparatus for a vehicle deck according to the exemplary embodiment of the present invention.

FIG. 1 is an exemplary plan view illustrating a deck frame in a tilting apparatus for a vehicle deck according to an exemplary embodiment of the present invention and FIG. 2 is an exemplary perspective view illustrating a deck plate in the tilting apparatus for a vehicle deck according to the exemplary embodiment of the present invention. As illustrated in FIGS. 1 and 2, the tilting apparatus for a vehicle deck may include a structure configured to perform both of the vertical tilting and horizontal tilting in a single system using a ball joint structure. For example, the tilting apparatus for a vehicle deck may include deck ball joint component 12 of four locations, (e.g., front, back, left and right locations), that couple together a chassis frame 10 and a deck plate 11. The deck ball joint component 12 may include a structure with a ball 17 disposed at a frame member 16 may be installed at the chassis frame 10 and a circular tube-shaped bracket 19 disposed at a plate member 18 may be installed at the deck plate 11 and may be coupled together via a ball joint.

Figure 3A:
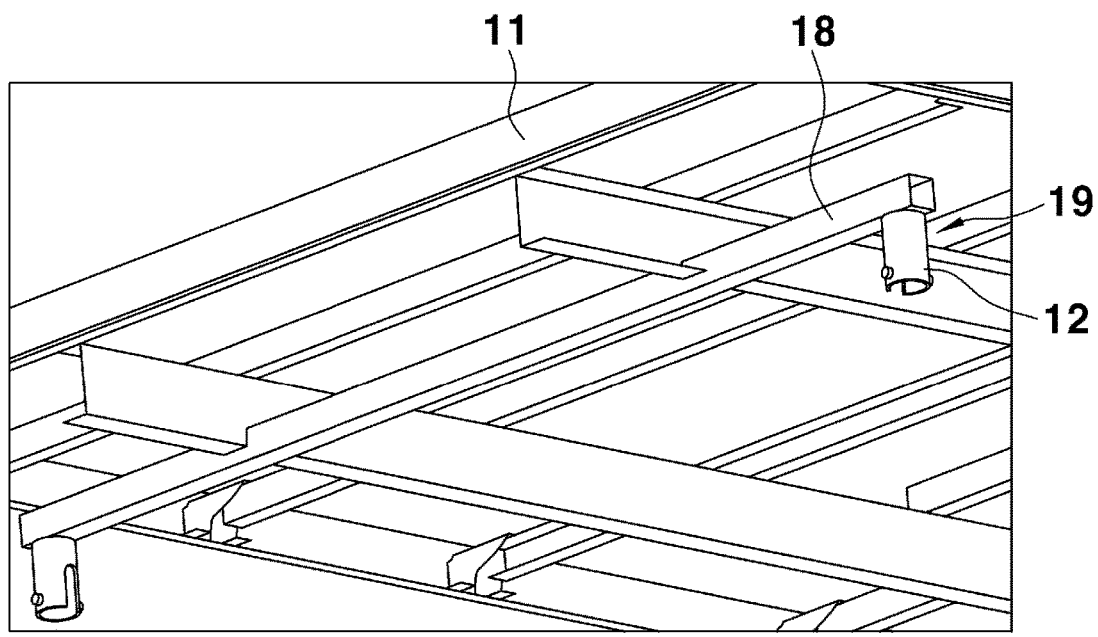
FIGS. 3A-3C are exemplary enlarged views of portions A, B, and C of FIG. 2 according to the exemplary embodiment of the present invention.

For example, each of a front end portion (e.g., front side of the vehicle) and a rear end portion (e.g., rear side of the vehicle) of an upper surface of the chassis frame 10 may include the tube-shaped frame members 16 disposed in parallel along a vehicle width direction. Further, both end portions of the frame member 16 may include the ball 17 with a neck component 21 having a diameter less than the diameter of the ball 17 (see FIG. 3C). Further, each of a front end portion and a rear end portion on a bottom surface of the deck plate 11 may include the tube-shaped plate member 18 disposed in parallel along the vehicle width direction. Additionally, both end portions of the plate member 18 may be vertically disposed with the circular tube-shaped brackets 19 (see FIG. 3A).

In particular, the plate member 18 and the frame member 16 may be disposed in parallel while facing each other at upper and lower portions. Therefore, the ball 17 formed at the end portion of the frame member 16 may be inserted into the brackets 19 formed at the end portion of the plate member 18 and may be coupled together with a detachable fixing pin 20. For example, as illustrated in FIGS. 5A-5D, the ball 17 at the frame member 16 may be formed at the end portion of the member through the neck component 21 and the bracket 19 at the plate member 18 may include a slot 22 cut by a predetermined length in a length direction from the lower end. Simultaneously, the inside thereof may include a concave spherical surface 29 to provide a rolling contact with the ball 17.

Furthermore, the ball 17 may be inserted into the bracket 19 through the lower portion of the bracket 19 and simultaneously the neck component 21 may be inserted along a slot 22 of the bracket 19. The ball 17 may be seated within the concave spherical surface 29 when the ball 17 is inserted into the bracket 19 and the fixing pin 20 may be horizontally coupled via pin apertures 26 at both side surface portions of the bracket 19. Further, the ball 17 may be locked downward by the fixing pin 20 and may be coupled to the bracket 19. When the fixing pin 20 is removed, the ball 17 and the bracket 19 may be separated from each other. Accordingly, the ball 17 inserted into the bracket 19 may be configured to freely rotate vertically, horizontally, and in all directions within the bracket, to freely rotate the ball 17 to provide sideward tilting or the backward tilting.

Further, the tilting apparatus for a vehicle deck may include a hydraulic machine 13 that may be configured to provide power for lifting and lowering the deck. The hydraulic machine 13 may include a hydraulic cylinder and a body portion coupled to the chassis frame 10 and a rod portion coupled to the deck plate 11. In other words, the hydraulic machine 13 may be configured to adjust (e.g., tilt) in a plurality of directions when installed in a center area of the chassis frame 10 and the rod 14 of the hydraulic machine 13 may be coupled to a center area of a bottom surface of the deck plate 11 by a hydraulic ball joint component 15.

Figure 4:
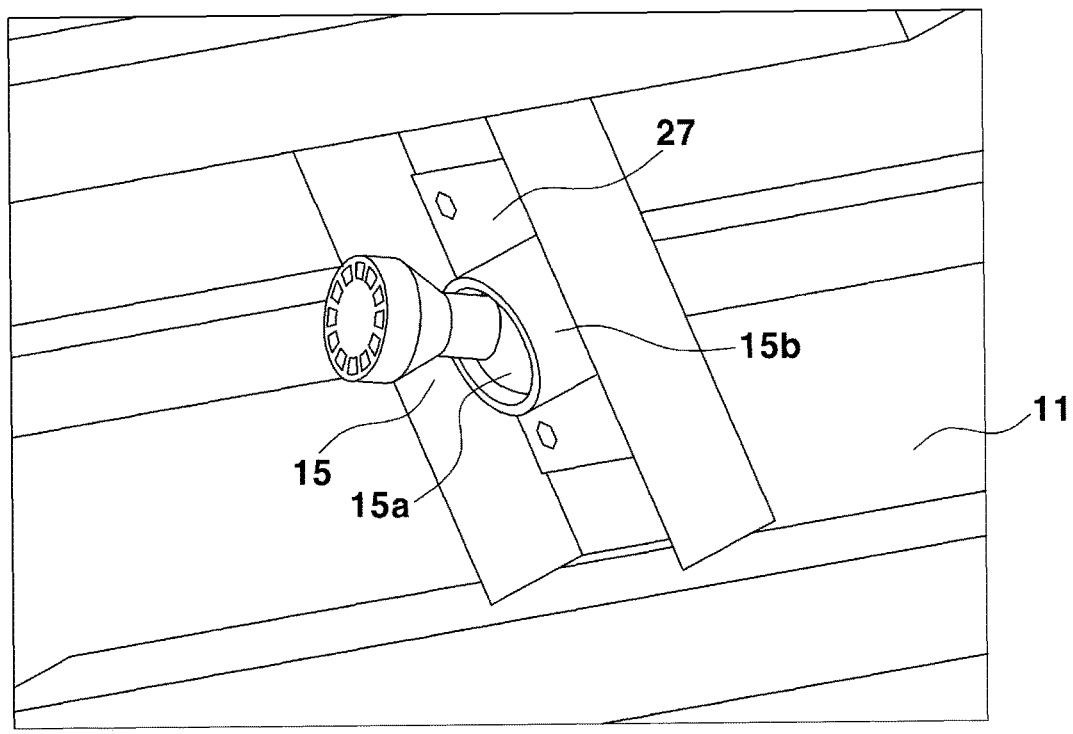
FIG. 4 is an exemplary perspective view illustrating a connection structure between a hydraulic machine and a deck plate in the tilting apparatus for a vehicle deck according to the exemplary embodiment of the present invention.
Figure 5A:
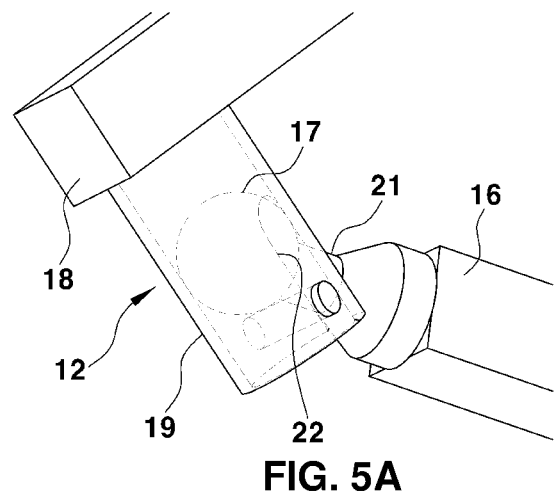
FIGS. 5A-5D are exemplary perspective views illustrating a member and a bracket shape in the tilting apparatus for a vehicle deck according to the exemplary embodiment of the present invention.
Figure 5B:
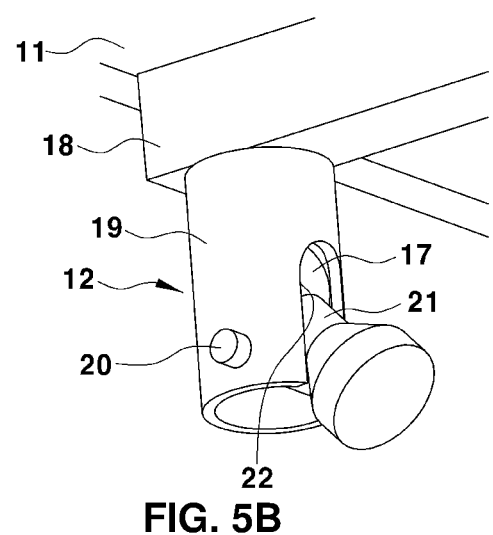
Figure 5C:
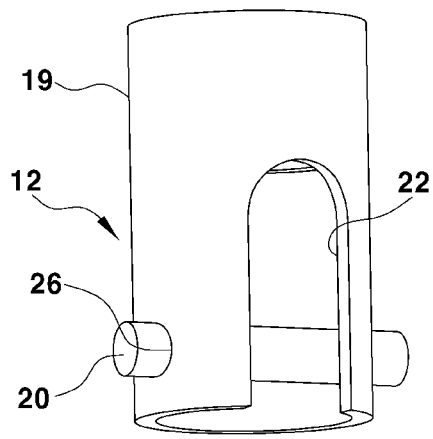
Figure 5D:
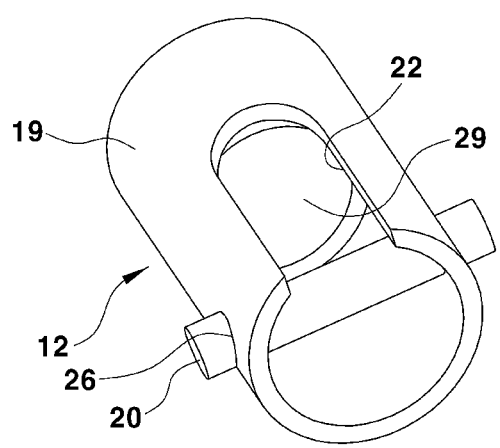

In particular, as illustrated in FIG. 4, the hydraulic ball joint component 15 may include a ball component 15a coupled with an end portion of the rod and a housing component 15b coupled to a housing bracket 27 of the deck plate 11 by a bolt fastening structure, a welding structure, or the like, with the ball component 15a disposed therein. An interior of the housing component 15b may include a rolling surface (not illustrated) configured to provide rolling-contact with the ball component 15a while enclosing the ball component 15a, and thus, the ball component 15a disposed at the rod side may be configured to rotate freely backward, sideward, or in a plurality of directions.

Figure 3B:
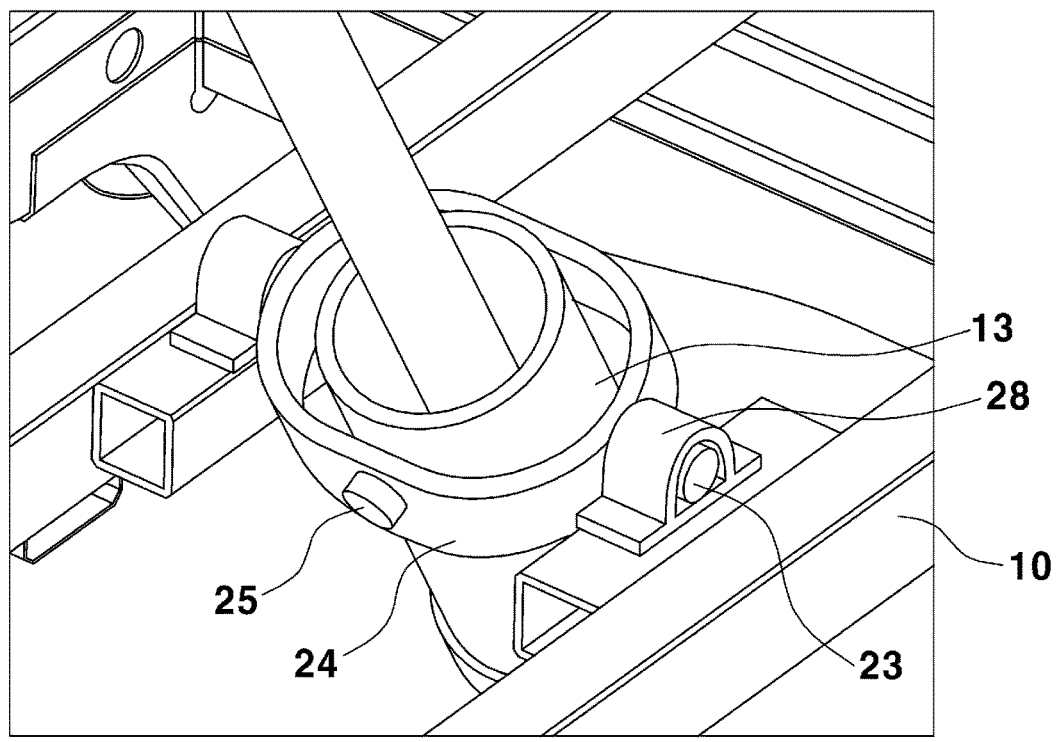
Figure 3C:
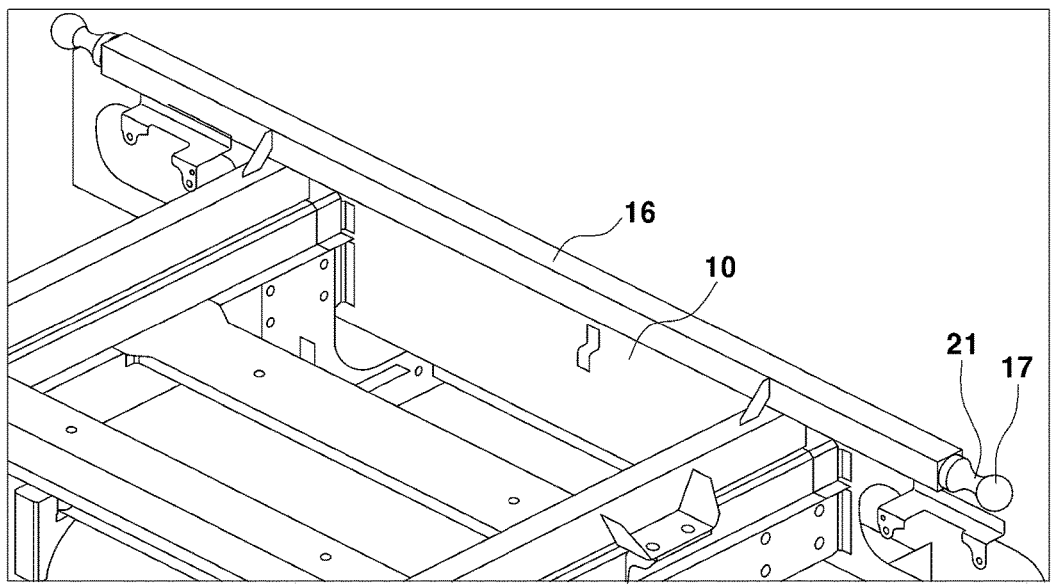

In particular, FIG. 3B illustrates a structure with the hydraulic machine 13 that may be tilted in two directions. For example, the hydraulic machine 13 may include a support body 24 that has both sides provided with first pins 23 and may be formed in a ring shape. The first pins 23 at both sides of the support body 24 may be coupled with pin brackets 28 on both sides of the chassis frame 10 in a vehicle length direction. Further, the support body 24 may be configured to rotate in the vehicle width direction (e.g., sideward tilting direction) based on the first pins 23, as a shaft, at both sides.

Further, the hydraulic machine 13 may be disposed within the support body 24. The second pins 25 disposed at both sides of the body of the hydraulic machine may be coupled on the support body 24 in parallel along the vehicle width direction. The hydraulic machine 13 may be configured to rotate in a vehicle length direction (e.g., vertical tilting direction) based on the second pins 25 disposed at both sides as a shaft. Ultimately, the hydraulic machine 13 may be configured to rotate in the vehicle length direction and may be configured to be simultaneously rotated in the vehicle width direction along with the support body 24.

Figure 6A:
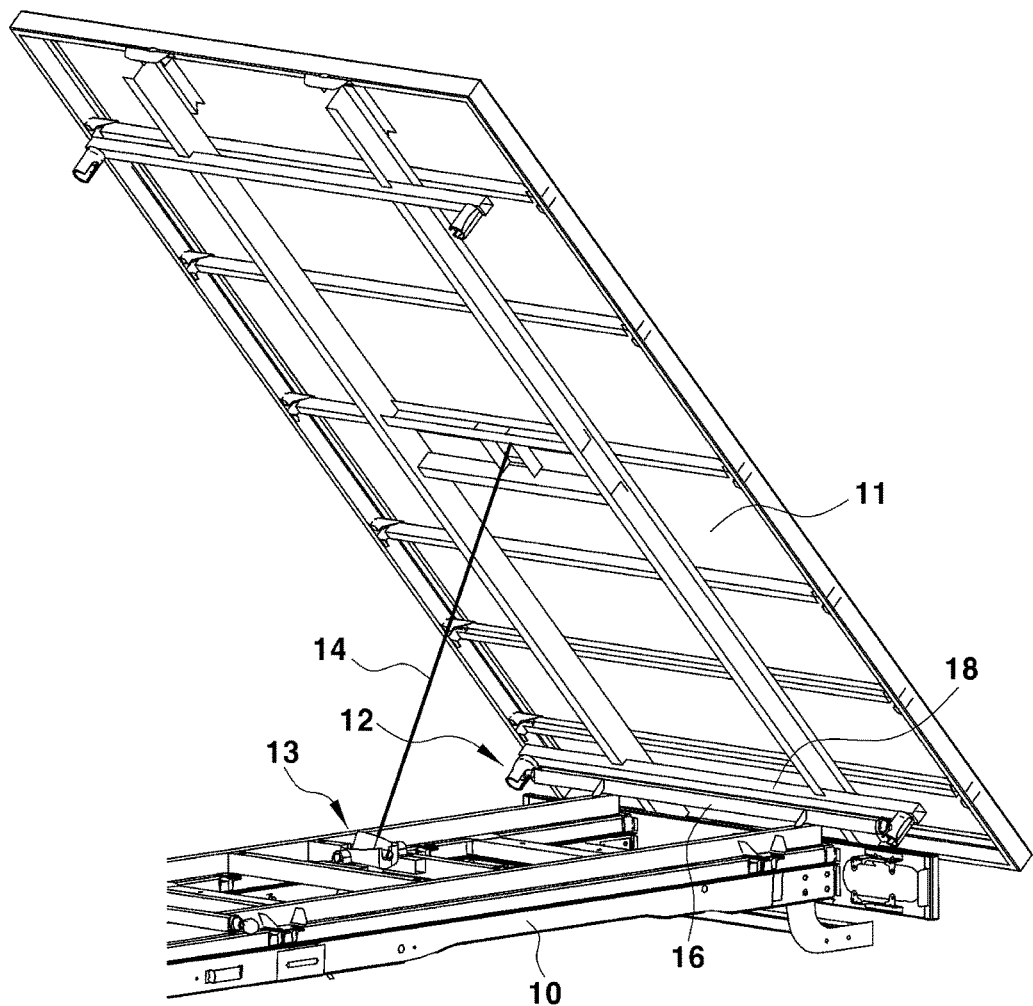
FIG. 6A-6C are an exemplary perspective views illustrating an operation state upon vertical tilting of the tilting apparatus for a vehicle deck according to the exemplary embodiment of the present invention.
Figure 6B:
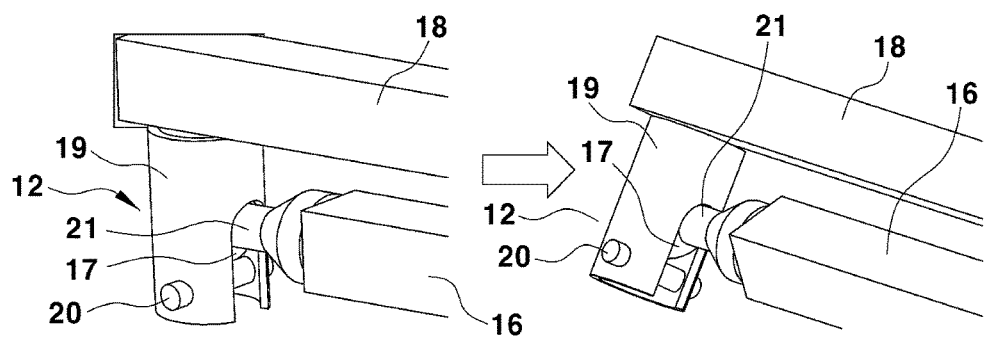
Figure 6C:
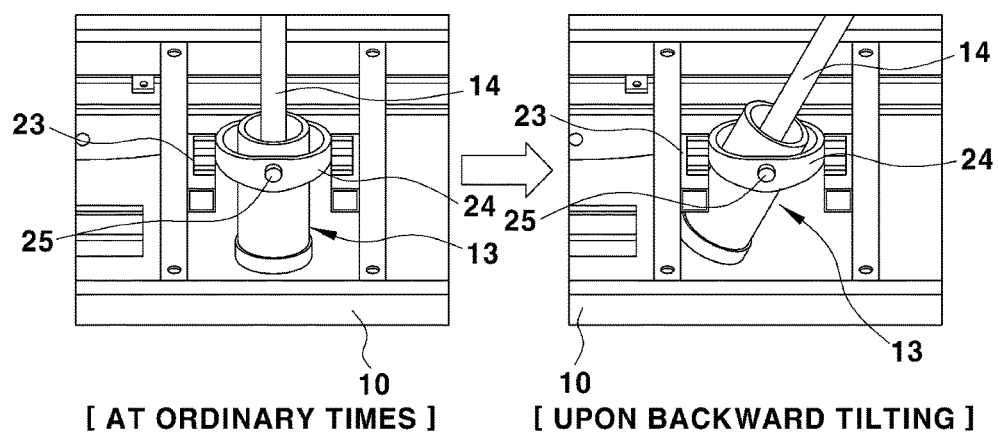

Therefore, the operation state of the tilting apparatus for a vehicle deck configured as described above will be described as follows. FIGS. 5A-6C are perspective views that illustrates an operation state based upon the vertical tilting of the tilting apparatus for a vehicle deck according to the exemplary embodiment of the present invention. As illustrated in FIGS. 6A-6C to adjust the vehicle deck backward, each of the fixing pins 20 coupled to the deck ball joint components 12 at both sides of the plate member positioned at the front side of the vehicle may be removed.

When the hydraulic machine 13 is configured to operate, the deck plate 11, or in other words the front side of the deck, may be configured to be adjusted in an upward vertical direction and simultaneously the deck plate 11 may be adjusted based on the deck joint components 12 of both sides of the plate member positioned at the rear side of the vehicle as a hinge point. In other words, the whole bracket 19 including the plate member 18 at the bottom surface of the deck plate 11 may be configured to be adjusted backward while rolling contacting the ball 17, the front side of the deck may be adjusted in an upward vertical direction (e.g., lifted) when the deck is tilted backward. In particular, the hydraulic ball joint component 15 coupled to the rod 14 of the hydraulic machine 13 may be configured to rotate by the rolling contact based on the backward tilting of the deck. The hydraulic machine 13 may be adjusted in a backward direction and may be configured to rotate based on the second pins 25 of both sides.

Figure 7A:
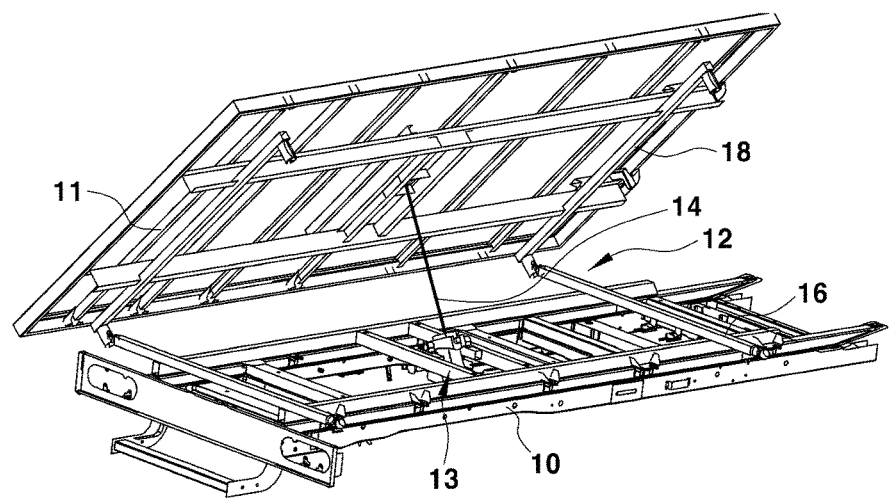
FIGS. 7A-7C are an exemplary perspective views illustrating an operation state upon horizontal tilting of the tilting apparatus for a vehicle deck according to the exemplary embodiment of the present invention.
Figure 7B:
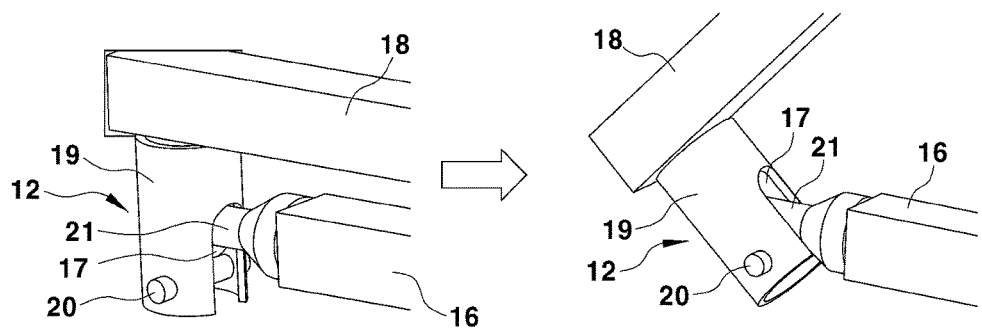
Figure 7C:
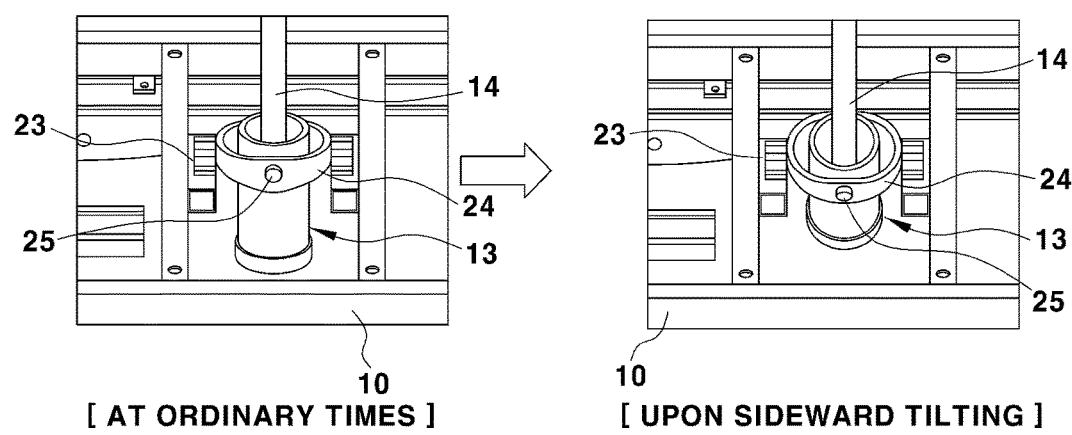

FIGS. 7A-7C are exemplary perspective views illustrating an operation state upon the horizontal tilting of the tilting apparatus for a vehicle deck according to the exemplary embodiment of the present invention. As illustrated in FIG. 7, to tilt the vehicle deck horizontally, each of the fixing pins 20 fastened with the front and rear deck joint components 12 positioned at the side of the vehicle may be removed. When the hydraulic machine 13 is operated, the deck plate 11, the side of the deck may be adjusted in an upward vertical direction (e.g., lifted up) and simultaneously the deck plate 11 may be configured to rotate based on the front and rear deck joint components 12 positioned at the side of the vehicle as a hinge point. In other words, the whole of the bracket 19 and the plate member 18 at the bottom surface of the deck plate 11 may be adjusted (e.g., leaned) horizontally while rolling contacting the ball 17 and the deck may be configured to be tilted horizontally when the side of the deck is rotated in an upward vertical direction.

In particular, the hydraulic ball joint component 15 coupled to the rod 14 of the hydraulic machine 13 may be configured to rotate by the natural rolling contact based on the horizontal tilting of the deck. The whole of the support body 24 may include the hydraulic machine 13 that may be naturally adjusted in a horizontal direction (e.g., leaned sideward) while being rotated based on the first pins 23 of both sides.

As described above, the present invention implements the system that may tilt the vehicle deck vertically and horizontally to increase the loading and unloading workability. In particular, the deck may be adjusted in the corresponding direction when the deck is tilted horizontally or when the deck is tilted vertically upon the loading and the unloading of the freights in the characteristics of the construction field or several industrial fields.

The tilting apparatus for a vehicle deck according to the present invention has the following advantages. Both the vertical tilting and the horizontal tilting of the vehicle deck may be performed in a single system, by applying the ball joint structure of four locations (e.g., the front, back, left, and right locations) and the hydraulic system of the center that may be tilted in two directions, thereby increasing the efficiency of the loading and unloading work such as loading and unloading freights in the vehicle deck vertically or horizontally based on the conditions of construction fields or industrial fields.

The invention has been described in detail with reference to exemplary embodiments thereof. However, it will be appreciated by those skilled in the art that the scope of the present invention is not limited to the exemplary embodiments as mentioned above and that changes may be made in these embodiments without departing from the principles and spirit of the invention, the scope of which is defined in the appended claims and their equivalents.

What is claimed is:

1. A tilting apparatus for a vehicle deck, comprising:
   deck ball joint components of a front position, a back position, a left position, and a right position that couple together a deck plate and a chassis frame; and
   the deck plate and a hydraulic ball joint component are coupled to a rod of a hydraulic machine coupled to the chassis frame, the hydraulic ball joint component being configured to translate in a plurality of directions toward a center area of a bottom surface of the deck plate to perform vertical tilting and horizontal tilting of the deck plate,
   wherein each deck ball joint component is configured to insert a ball formed at an end portion of a frame member into a circular tube-shaped bracket formed at an end portion of a plate member and is coupled with a detachable fixing pin.

2. The tilting apparatus of claim 1, wherein the ball includes a neck component and the bracket includes a slot in a length direction of the vehicle deck that extends from a lower end and the ball is configured to enter the bracket using the neck component slidably inserted into the slot and is coupled to the bracket.

3. The tilting apparatus of claim 1, wherein a body of the hydraulic machine coupled to the chassis frame is rotatable in a plurality of directions and is inserted into a support body rotatably disposed in a vehicle length direction and supported on the chassis frame by a first pin and is rotatably installed in a vehicle width direction and supported on a support body by a second pin.

4. The tilting apparatus of claim 1, wherein the hydraulic ball joint component includes a ball component coupled with the rod and a housing component disposed on the deck plate and configured to receive the ball component.

5. A vehicle comprising the tilting apparatus of claim 1.

6. The tilting apparatus of claim 1, wherein the frame member is disposed in parallel along a vehicle width direction on each of a front end portion and a rear end portion of an upper surface of the chassis frame.

* * * * *